Patented Sept. 4, 1945

UNITED STATES PATENT OFFICE 2,384,365

MANUFACTURE OF 2,4-DINITRO-6-CYCLOHEXYL-PHENOL

Joseph W. Britton and Robert C. Dosser, Midland, Mich., assignors to The Dow Chemical Company, Midland, Mich., a corporation of Michigan No Drawing. Application October 30, 1943,
Serial No. 508,386

5 Claims. (Cl. 260—619)

This invention concerns an improved method for the manufacture of 2,4-dinitro-6-cyclohexyl-phenol.

As taught in United States Patents, 1,880,404 and 2,112,543, 2,4-dinitro-6-cyclohexyl-phenol has heretofore been produced by reacting sulphuric acid with ortho-cyclohexy-phenol and reacting the resultant cyclohexyl-phenol-sulphonic acid with nitric acid to form the desired product. The latter is filtered from the reaction mixture, washed free of acid with water, and dried. There are certain disadvantages inherent in this usual method of manufacture. The product is obtained in the form of extremely fine crystals which tend to plug filters, hence, are difficult and troublesome to separate from the reaction mixture and free from impurities.

We attempted to substitute alkali nitrate for nitric acid in the nitration step. Such nitrate would be converted to nitric acid by the action of the sulphuric acid in the sulphonation mixture, and the nitric acid formed in situ would then be available for nitrating the sulphonic acid. This procedure was not successful when either sodium nitrate or potassium nitrate were used, because an intermediate salt, probably the sodium or potassium salt of mono-nitro-ortho-cyclohexyl-phenol sulphonic acid, crystallized out of the reaction mixture. This not only greatly reduced the yield of dinitro-cyclohexy-phenol, but also gave a mixed product consisting of the aforesaid dinitro-phenol and salt of the nitro-sulphonic acid.

We have found, however, that the difficulty just described does not occur when ammonium nitrate is used as the nitrating agent. There is no crystallizing out of an intermediate nitro-sulphonic acid salt, a high yield of the desired dinitro-ortho-cyclohexyl-phenol is obtained, and the crystals of the latter are larger and better defined, so that they can be rapidly filtered and washed free of adhering mother liquor. When dried, the crystalline product, prepared by the use of ammonium nitrate as the nitrating agent, has a bulk density approximately 25 per cent greater than that of the same compound prepared by using nitric acid as the nitrating agent.

In preparing 2,4-dinitro-6-cyclohexyl-phenol by the present method, one molecular equivalent of ortho-cyclo-hexyl-phenol is mixed with at least 2, and preferably from 2.5 to 4, molecular equivalents of concentrated sulphuric acid and the mixture is brought to a reaction temperature, e. g. of from 60° to 110° C., usually for a period of from 1 to 2 hours. In practice, the ortho-cyclohexyl-phenol reactant is preferably melted and is added in molten form, gradually and with stirring to the cold concentrated sulphuric acid, and the resultant mixture is allowed to heat spontaneously to a reaction temperature of from 80° to 110° C. Stirring is preferably continued throughout the reaction. The sulphonation reaction is complete when a sample of the mixture is found to be soluble in water. The product, at this stage in the process, is probably a mixture of the ortho-cyclohexyl mono- and di-sulphonic acids, but it may consist predominantly of either of said acids. The principal requirement is that it be soluble in water.

The mixture is then cooled and diluted with water. This dilution step is usually accomplished by gradually adding about 2 volumes of water to the reaction mixture while stirring and cooling the latter, but it may be accomplished in other usual ways, e. g. the sulphonated mixture may be added, with stirring and cooling, to the water. Precautions such as those taken in diluting sulphuric acid with water should be observed in carrying out the dilution step.

The diluted sulphonic acid solution is added gradually and with stirring to an aqueous ammonium nitrate solution while heating the latter at a reaction temperature, e. g. of from 70° to 100° C., and preferably from 80° to 90° C. At least the stoichiometric amount, i. e. 2 molecular equivalents, of ammonium nitrate is used per mole of the ortho-cyclohexyl-phenol initially employed, and the dinitro-cyclohexyl-phenol product is formed in optimum yield when a considerable excess of ammonium nitrate is used. Three moles or more of ammonium nitrate may be employed per mole of the cyclohexyl phenol starting material without overnitration occurring. Usually, from 2.75 to 3 molecular equivalents of ammonium nitrate is used per mole of the cyclohexyl phenol. The nitration reaction which takes place is exothermic; hence, the rate of mixing should be controlled so as to prevent the reaction from occurring too vigorously. After mixing the sulphonic acid and the ammonium nitrate, stirring of the mixture while at the reaction temperature is continued for a time sufficient to assure the desired degree of nitration. The total time required to carry out the nitration reaction is usually from 3 to 5 hours.

After completing the nitration reaction, the mixture is cooled, filtered, and the resulting crystalline product is washed free of occluded mother liquor and dried.

Example 176 grams (1.0 mole) of ortho-cyclohexyl-phenol was melted and added gradually and with stirring to 350 grams (3 moles) of 98 per cent concentrated sulphuric acid. An exothermic reaction occurred with spontaneous heating of the mixture to about 80° C. After adding the ortho-cyclo-hexyl-phenol the mixture was maintained at approximately 80° C. for about 15 minutes, at the end of which time a small sample of the mixture was found to be entirely soluble in water. The mixture was then cooled to 50° C., and 450 cc. of water was gradually stirred into the same with continued cooling to maintain the mixture at about 50° C. The resultant diluted solution of the ortho-cyclohexyl-phenol sulphonic acid was added with stirring, over a period of 2 hours, to a solution of 240 grams (3.0 moles) of ammonium nitrate and 480 cc. of water, which latter solution had been heated to 80° C. During addition of the sulphonic acid, an exothermic reaction occurred and the mixture was cooled to maintain it at about 80° C. After adding the sulphonic acid, the mixture was stirred and maintained at temperatures between 80° and 90° C. for 2 hours. It was then cooled to below 30° C. and the crystalline, 2,4-dinitro-6-cyclohexyl-phenol product was filtered from the mixture. The crystalline product was washed successively with warm and cold water to free it of occluded mother liquor and other impurities, after which it was dried. The filtering and washing operations were carried out readily and rapidly without plugging of the filter. There was obtained 230 grams (0.86 mole) of substantially pure 2,4-dinitro-6-cyclohexyl-phenol. The yield was 86 per cent of theoretical, based on the ortho-cyclohexyl-phenol employed.

Other modes of applying the principle of the invention may be employed instead of those explained, change being made as regards the method herein disclosed, provided the step or steps stated by any of the following claims, or the equivalent of such stated step or steps be employed.

We therefore particularly point out and distinctly claim as our invention:

1. In a method for making 2,4-dinitro-6-cyclohexyl-phenol, the step of reacting an ortho-cyclohexyl-phenol sulphonic acid with ammonium nitrate in the presence of water as a reaction medium.

2. In a method for making 2,4-dinitro-6-cyclohexyl-phenol, the step of reacting an ortho-cyclohexyl-phenol sulphonic acid with approximately 2 molecular equivalents of ammonium nitrate at a reaction temperature between 70° and 100° C. in the presence of water as a reaction medium.

3. In a method for making 2,4-dinitro-6-cyclohexyl-phenol, the step of reacting a water-soluble ortho-cyclohexyl-phenol sulphonic acid with approximately 2 molecular equivalents of ammonium nitrate at a reaction temperature between about 80° and about 90° C. in the presence of water as a reaction medium.

4. In a method for making 2,4-dinitro-6-cyclohexyl-phenol, the steps which consist in reacting one molecular equivalent of ortho-cyclohexyl-phenol with concentrated sulphuric acid to form a water-soluble sulphonic acid of ortho-cyclohexyl-phenol, diluting said sulphonic acid with water, gradually adding the diluted cyclohexyl-phenol sulphonic acid solution to an aqueous solution of ammonium nitrate while heating the resultant mixture to a reaction temperature between 70° and 90° C., and thereafter separating 2,4-dinitro-6-cyclohexyl-phenol from the mixture.

5. In a method for making 2,4-dinitro-6-cyclohexyl-phenol, the steps which consist in reacting one molecular equivalent of ortho-cyclohexyl-phenol with concentrated sulphuric acid to form a water-soluble cyclohexyl-phenol sulphonic acid, diluting the latter with water, gradually adding the diluted cyclohexyl-phenol disulphonic acid to an aqueous solution of ammonium nitrate while maintaining the resultant mixture at a reaction temperature between 80° and 90° C. and thereafter cooling the mixture and filtering it to recover therefrom crystalline 2,4-dinitro-6-cyclohexyl-phenol.

JOSEPH W. BRITTON.
ROBERT C. DOSSER.